Aug. 14, 1928.
R. LARSEN
1,681,121
WATCHMAKER'S GAUGE
Filed Oct. 6, 1927
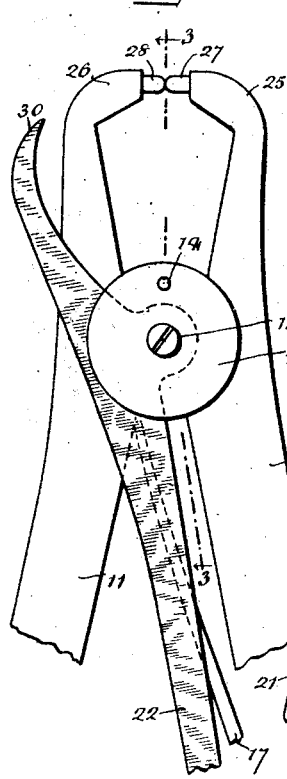
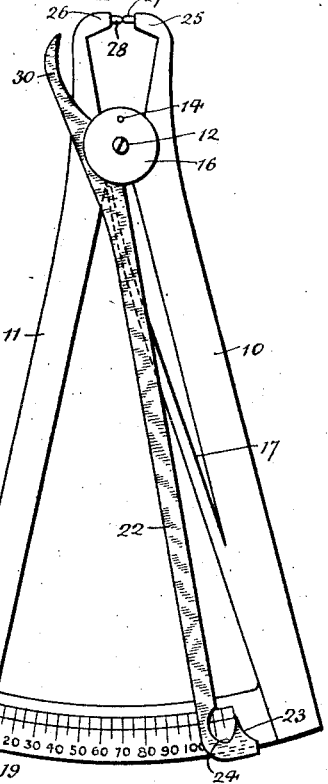
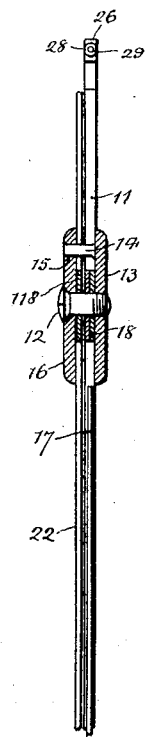
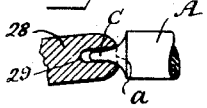
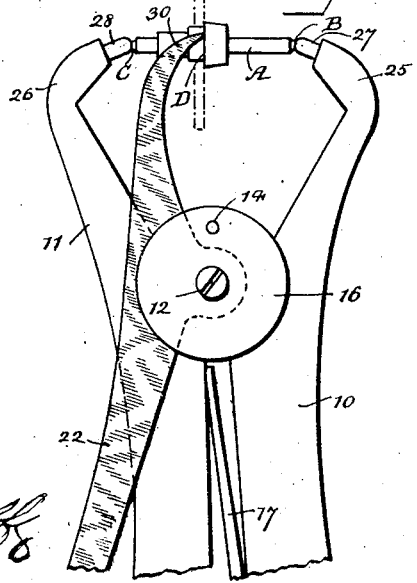
WITNESSES
INVENTOR
Robert Larsen
BY
ATTORNEY Patented Aug. 14, 1928.

1,681,121

UNITED STATES PATENT OFFICE.

ROBERT LARSEN, OF NEW YORK, N. Y.

WATCHMAKER'S GAUGE.

Application filed October 6, 1927. Serial No. 224,475.

My invention relates to a watchmaker's gauge, and particularly to a gauge for ascertaining the dimensions of a given size balance staff in repairing watches where the staff has been broken. The staff is formed with end bearing cones and breakage occurs adjacent to the base of either cone, making it difficult with ordinary calipers or gauge instruments to ascertain accurately certain dimensions of the balance staff.

The general object of my invention is to provide a watchmaker's gauge of a character that will enable the precise measurements to be obtained even though one of the end bearings has become broken.

A further important object of the invention is to provide a watchmaker's gauge or calipers that will enable the determination not only of the total length of the balance staff but also the distance between an end of the staff and the shoulder with which the staff is formed.

The nature of my invention and its distinguishing features and advantages will clearly appear as the description proceeds.

Reference is to be had to the accompanying drawing forming a part of this specification, it being understood that the drawing is merely illustrative of one example of the invention.

Figure 1 is an elevation of a watchmaker's gauge embodying my invention.

Figure 2 is an enlarged elevation of a portion of the gauge.

Figure 3 is a longitudinal section as indicated by the line 3—3 of Figure 2.

Figure 4 is a partial elevation similar to Figure 2, but showing the balance staff in position in the gauge.

Figure 5 is a detail with the terminal of one arm of the gauge in section and an end of the balance staff with its cone bearing terminal in elevation.

In carrying out my invention in practice in accordance with the illustrated example, two side arms 10, 11, are provided, pivotally connected as usual by a transverse screw 12, said screw 12 passing through one side disc 13 having a lateral pin 14 which is accommodated in a pin hole 15 in a corresponding disc 16 at the opposite side of the gauge. A spring 17 extending from one arm, as 10, bears at its free end against the opposite arm 11, tending to bring the operative ends of the gauge toward each other. Integral or otherwise made rigid with one arm 10 is an arcuate graduated member 19 over which the pointed index terminal 20 of the arm 11 is adapted to be moved for indicating by the graduations of said member 19 the dimension or the total length of a balance staff. On the member 19 at the free end thereof is a stop member 21 against which the arm 11 may contact to limit its movement in one direction.

Coordinated with the arms 10 and 11 and the graduated member 19 is an auxiliary gauge arm 22 held by the pivot 12 and having an inwardly directed indicating pointer 23 thereon, between which pointer and the adjacent side of the gauge arm 22 is a sight opening 24, said pointer 23 and the sight opening 24 being adapted to be moved over the graduations of the member 19.

The numeral 18 indicates the ears on arms 10 and 11 through which screw 12 passes, and 118 indicates the member on arm 22 through which the said screw also passes.

The caliper or gauging ends of the arms 10, 11 are directed laterally inward toward each other, as at 25, 26, and said inwardly directed ends 25, 26, are provided with gauge members 27, 28, adapted to contact with each other or to be separated the required distance for gauging a balance staff.

In Figure 4 the letter A indicates a balance staff, B a broken pin or cone bearing at one end of said staff, and C (Figures 4 and 5) indicates an unbroken cone bearing at the opposite end of the staff. The letter D indicates a shoulder on the usual balance staff, and to be hereinafter referred to. The letter *a* in Figure 5 indicates the line of breakage adjacent the base of the cone bearing C. In the terminal 28 of the arm 11, see Figure 5, is formed a recess 29 to receive the major portion of the cone bearing so that the contact is made on a line corresponding with the usual line of breakage of the bearing. The numeral 30 indicates the gauging or caliper end of the auxiliary gauge arm 22.

In using my improved gauge, a broken balance staff may be positioned between the terminals 27, 28, as shown in Figure 4, the one terminal 27 contacting with the broken bearing B at the line corresponding with the line *a* in Figure 5. The opposite terminal 28 is engaged with the opposite end of the balance staff A by entering the end of the bearing C in the recess 29. This gives the dimension of the staff or total length thereof between the bearing line $a$ of the unbroken pin and the corresponding end of the broken pin B. When the balance staff, which is made in various sizes, is positioned between the terminals 27, 28, as described, the indicating pointer 20 will indicate on the graduated arm 19 the gauge of the balance staff being measured. To ascertain the distance between the end of a broken cone bearing or pin B and the shoulder D (see Figure 4), one terminal 27 is brought against the broken bearing B and the terminal 30 of the auxiliary gauge arm 22 is brought into contact with the shoulder D, whereby the pointer 23 will indicate the length between said broken end of the cone bearing and the said shoulder D.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

I claim:

1. A device of the class described, including two arms pivoted to each other and having oppositely disposed gauge members at one end, a transverse graduated member on one of the arms at the opposite end, and an indicating member on the other arm at said opposite end to traverse the graduations of said indicating member, one of the said gauge members having a recess to receive a bearing of a balance staff, the other member being adapted to engage the opposite end of the staff.

2. A watchmaker's gauge having arms pivoted to move toward and from each other, gauge members on said arms at one end, a transverse graduated member on one of said pivoted arms at the opposite end, and an auxiliary gauge arm adapted to move toward and coact with the gauge member on one of the first-mentioned arms and having an indicating member adapted to move over said graduated member.

3. A device of the class described, including two gauge arms having engaging members at one end of said device for gauging the length of a balance staff, indicating means at the opposite end of the device, and a third arm constituting an auxiliary gauge element in a plane at the side of the first-mentioned plane, said auxiliary gauge element being adapted to coact with one of said first-mentioned gauge arms to engage an intermediate shoulder on a balance staff, said auxiliary element having an indicating device to coact with said indicating means.

Signed at New York in the county of New York and State of New York this 4th day of October, A. D. 1927.

ROBERT LARSEN.